United States Patent
Fan

(10) Patent No.: US 9,288,855 B2
(45) Date of Patent: Mar. 15, 2016

(54) DRIVING CIRCUIT FOR DRIVING LED LOAD

(71) Applicant: Himax Analogic, Inc., Tainan (TW)

(72) Inventor: Hang-Yu Fan, Tainan (TW)

(73) Assignee: Himax Analogic, Inc., Tainan (TW)

( * ) Notice: Subject to any disclaimer, the term of this patent is extended or adjusted under 35 U.S.C. 154(b) by 320 days.

(21) Appl. No.: 14/018,435

(22) Filed: Sep. 5, 2013

(65) Prior Publication Data

US 2015/0061517 A1     Mar. 5, 2015

(51) Int. Cl.
    *H05B 33/08*         (2006.01)
(52) U.S. Cl.
    CPC .......... *H05B 33/0815* (2013.01); *H05B 33/089* (2013.01)
(58) Field of Classification Search
    None
    See application file for complete search history.

(56) References Cited

U.S. PATENT DOCUMENTS

| | | | | |
|---|---|---|---|---|
| 8,659,239 | B2 * | 2/2014 | Liao | H05B 33/0854 315/224 |
| 2008/0074058 | A1 * | 3/2008 | Lee | H05B 33/0815 315/291 |
| 2011/0037387 | A1 * | 2/2011 | Chou | F21K 9/135 315/35 |
| 2012/0139438 | A1 * | 6/2012 | Soleno | H05B 33/0815 315/291 |

FOREIGN PATENT DOCUMENTS

| TW | I236165 B | 7/2005 |
|---|---|---|
| TW | 201106800 A | 2/2011 |
| TW | 201117670 A | 5/2011 |
| TW | I396366 B | 5/2013 |

\* cited by examiner

*Primary Examiner* — Douglas W Owens
*Assistant Examiner* — Dedei K Hammond
(74) *Attorney, Agent, or Firm* — CKC & Partners Co., Ltd.

(57) ABSTRACT

A driving circuit includes a rectifier circuit and a LED driver integrated circuit. The rectifier circuit rectifies an ac power supply into a dc power supply. The LED driver integrated circuit includes a regulator circuit, a voltage detector, a buck boost LED driver, and a common ground terminal. The regulator circuit regulates the dc power supply into a regulated voltage. The voltage detector detects whether the regulated voltage meets a voltage requirement and output the regulated voltage when the voltage requirement is met. The buck boost LED driver converts the regulated voltage detected into an output driving voltage according to a remaining voltage at a negative terminal of the LED load to drive the LED load. Voltage potentials at the common ground terminal and at a load ground terminal of the LED load are the same.

14 Claims, 5 Drawing Sheets

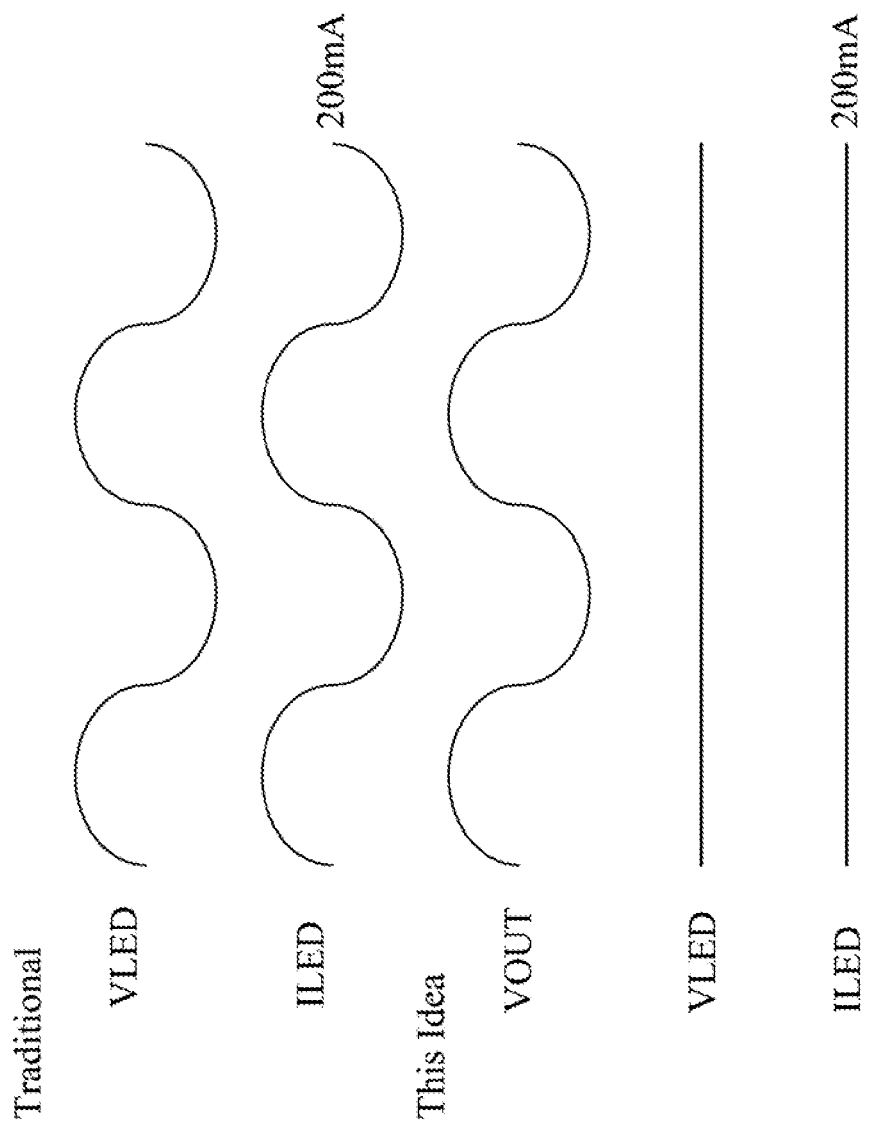

DRIVING CIRCUIT FOR DRIVING LED LOAD

BACKGROUND

1. Technical Field

The present disclosure relates to a driving circuit. More particularly, the present disclosure relates to a driving circuit for LEDs.

2. Description of Related Art

With the rapid development of photoelectric technology, the industry in recent years has developed many kinds of innovative illumination equipments, among which light-emitting diode (LED) lamps obtain widespread attention. Luminous efficiency and durability of the LED lamps are superior to traditional incandescent tubes, and the LED lamps are eco-friendly in manufacturing. As such, the LED lamps are more welcome in the era of energy saving and environmental protection.

Concerning the lighting system composed of LED lamps known as featuring high efficiency and long durability, conversion efficiency and power factor (PF) are two main factors to achieve the high efficiency on the LED lamps. The conversion efficiency is referred to how much input power is actually transferred to LEDs during the process from the alternating-current (AC) power input to the LED output. The conversion efficiency is higher when a higher proportion of the input power is communicated to the output power.

The power factor is related to the real power and the reactive power of a power signal. The power company usually provides a three-phased AC power signal with a household voltage ranged from 110V-220V and an alternating frequency ranged from 50 Hz-60 Hz. In general, an instantaneous power consumption of a resistive load is the product of voltage and current (i.e., P=VI). However, a pure inductive load or a pure capacitive load may cause a phase difference of 90° between current and voltage, and the phase difference will result in a loss of real power. The instantaneous power consumption can be calculated as the following:

P=VI cos θ, in which I represents the current, V represents the voltage, and θ represents the phase difference between the current and the voltage.

In addition, the power factor can be calculated as follows:

$$PF = \frac{VI\cos\theta}{VI},$$

in which PF represents the power factor, I represents the current, V represents the voltage, and θ represents the phase difference between the current and the voltage. As shown in the expression above, when the phase difference between current and voltage is 90° (e.g., when the load is a pure inductive load or a pure capacitive load), the power factor will be substantially decreased to zero.

Because the LED has characteristics of inductance and capacitance, it will result in the phase difference between the input voltage and the input current, and also result in the declination of the power factor. Therefore, the improvement of the power factor is required to achieve energy-saving, and it is necessary for the driving circuit to employ a power factor corrector. However, driving circuits which have the power factor corrector usually suffer from the current ripple problem and the flicker problem, which makes the LED current unstable and declines the quality of the emitting light.

SUMMARY

According to one embodiment of the present invention, a driving circuit for driving a LED load is disclosed, in which the driving circuit includes a rectifier circuit, a LED driver integrated circuit, and a buck boost LED driver. The rectifier circuit rectifies an ac power supply into a dc power supply. The LED driver integrated circuit includes a regulator circuit, a voltage detector, a signal generator, and a common ground terminal. The regulator circuit regulates the dc power supply into a regulated voltage. The voltage detector detects whether the regulated voltage meets a voltage requirement and for outputting to the regulated voltage when the voltage requirement is met. The signal generator, electrically connected to the voltage detector, generates a pulse width modulation signal. Voltage potentials at the common ground terminal and at a load ground terminal of the LED load are the same. The buck boost LED driver converts the regulated voltage detected into an output driving voltage according to a remaining voltage at a terminal of the LED load to drive the LED load.

BRIEF DESCRIPTION OF THE DRAWINGS

The disclosure can be more fully understood by reading the following detailed description of the embodiments, with reference to the accompanying drawings as follows:

FIG. 5 shows wave diagrams of LED voltages and LED current.

DETAILED DESCRIPTION

Figure 1:
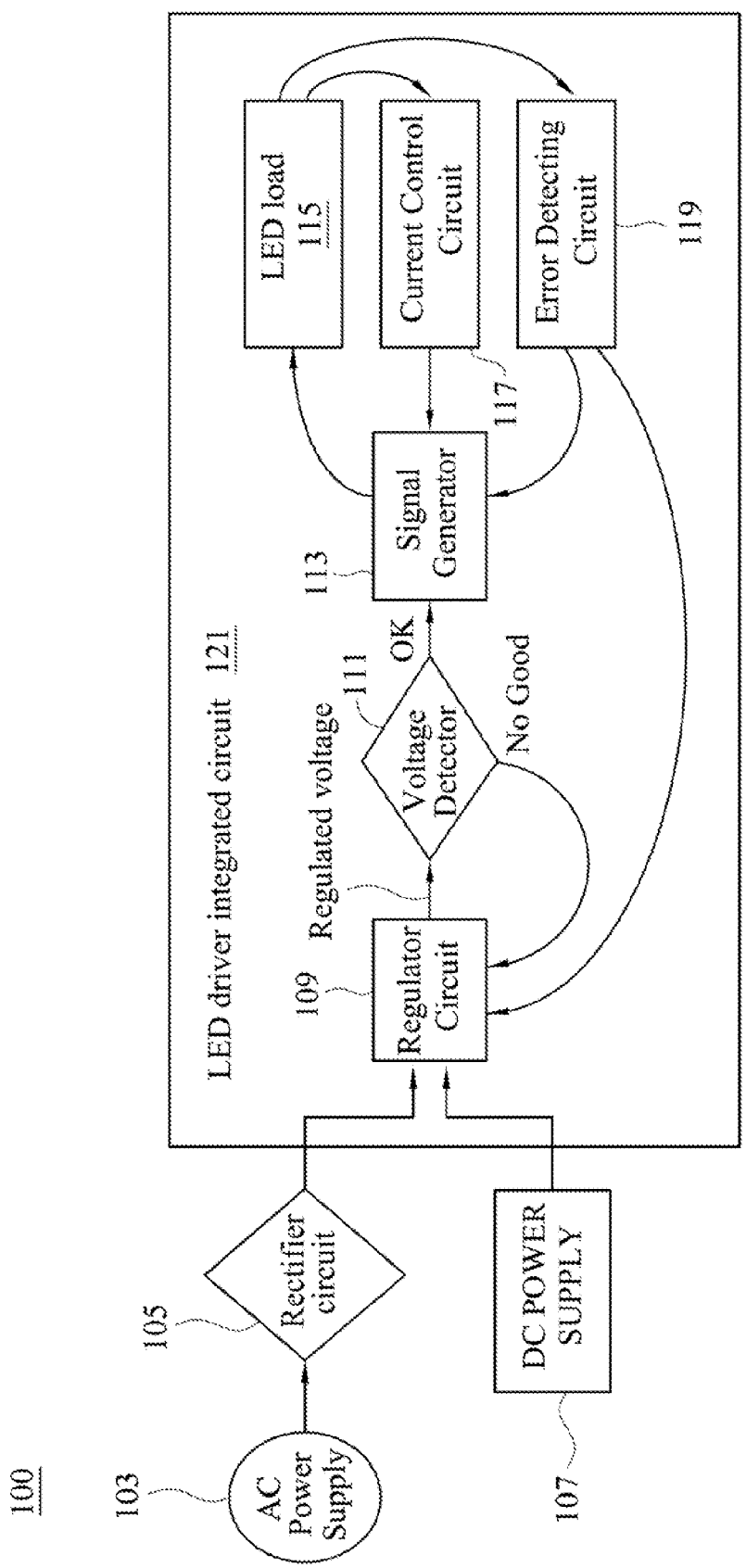
FIG. 1 is a block diagram of a driving circuit for driving a LED load according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

The driving circuit of the following embodiment utilizes a rectifier circuit and a single LED driver integrated circuit to convert an AC power source into a DC power source first, and the DC power source is subsequently converted into CC (Constant Current) for driving the LED load. As a result, the current and the voltage of the LED load can be stable without ripples, and the flicker problem can be prevented, which improve the lighting quality. In addition, a power factor corrector is also employed to improve the power factor (PF), such as in the signal generator, and the unnecessary power consumption is thus reduced.

FIG. 1 is a block diagram of a driving circuit for driving a LED load according to one embodiment of the present invention. The driving circuit 100 for driving a LED load 115 includes a rectifier circuit 105, a LED driver integrated circuit 121, and a buck boost LED driver (shown in FIG. 2, Reference number 203).

The rectifier circuit 105, such as a bridge rectifier, rectifies an AC power supply 103 into a DC power supply. Usually, the AC power supply 103 can be a 110V or 220V voltage signal which has a frequency ranged from 50 HZ to 60 HZ.

Figure 2:
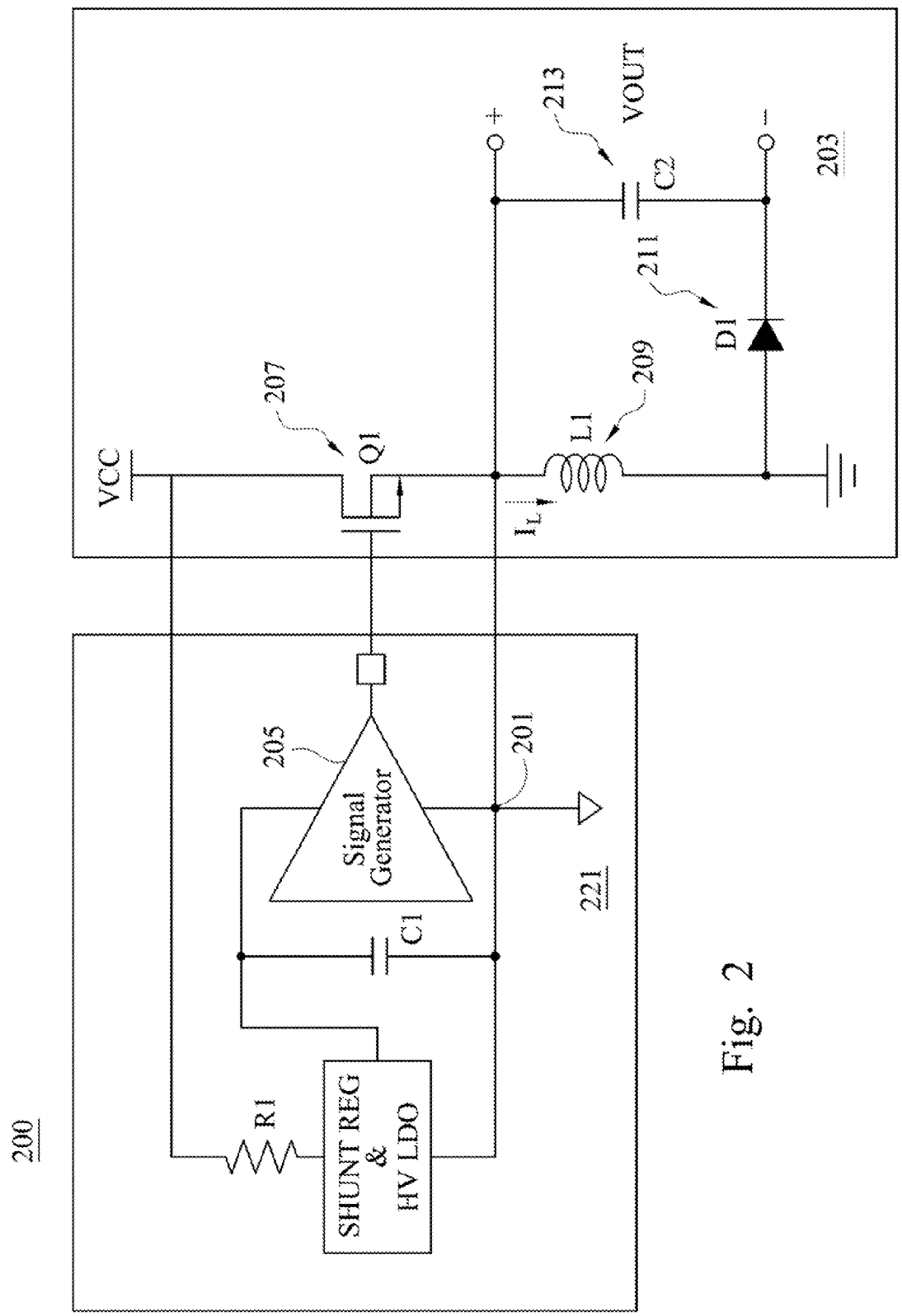
FIG. 2 is a circuit diagram of part of a driving circuit for driving the LED load according to one embodiment of the present invention.

The LED driver integrated circuit 121 includes a regulator circuit 109, a voltage detector 111, a signal generator 113, and a common ground terminal (Reference number 201 in FIG. 2). The regulator circuit 109 regulates the DC power supply into a regulated voltage, in which the DC power supply can come from either the rectifier circuit 105 or directly the DC power supply 107. With to the regulator circuit 109, the LED driver integrated circuit 121 will not suffer from damages caused by an over voltage that excesses a voltage limit.

The voltage detector 111 detects whether the regulated voltage meets a voltage requirement and outputs the regulated voltage when the voltage requirement is met. For example, the voltage detector 111 detects if the regulated voltage is a stable voltage fixed to a certain volt, such as 10V. If the regulated voltage is a 10V stable signal, it is passed to the signal generator 113 for operation. On the other hand, if the regulated voltage fails to be the 10V stable signal, the voltage detector 111 makes the regulator circuit 109 repeatedly produce the regulated voltage until the regulated voltage satisfies the requirements.

The signal generator 113, electrically connected to the voltage detector 111, generate a pulse width modulation signal (PWM). The duty cycle of the pulse width modulation signal is proportional to a required turned on voltage of the LED load 115. Specifically, if the LED string composed of several LEDs connected in series requires 30V to turn on, the duty cycle of the pulse width modulation signal is set to a corresponding period which is sufficient to generate a 30V voltage drop to the LED string.

When the LED load 115 is able to turn on by the driving voltage, a current control circuit 117 controls a current volume of a load current flowing through the LED load 115 and provides a remaining voltage at a negative terminal (Reference number 315 in FIG. 3) of the LED load 115. If the remaining voltage is too high, which means that the signal generator 113 has generated too much energy than required, the current control circuit 117 makes the signal generator 113 shorten the duty cycle of the pulse width modulation signal, and the unnecessary power consumption can be minimized. Therefore, power consumption can be saved. In addition, the current control circuit 117 also locks the current volume of the load current when the LED load 115 is able to turn on.

The error detecting circuit 119 monitors the LED load 115 as well as the current control circuit 117 and stops the signal generator 113 from operation according to a monitoring result. In more detail, the error detecting circuit 119 stops the signal generator 113 from operation when the LED load 115 or the current control circuit 117 is open or short.

With the two level circuit structure (AC to DC and DC to CC) stated above, number and energy of current ripples can be reduced, and the lighting quality can be improved.

FIG. 2 is a circuit diagram of part of a driving circuit for driving the LED load according to one embodiment of the present invention. In this embodiment, a LED driver integrated circuit 221 and a buck boost LED driver 203 of the driving circuit 200 are presented. The signal generator 205 is employed to generate a pulse width modulation signal.

The buck boost LED driver 203 such as a bootstrap type inverting buck boost LED driver, converts the regulated voltage detected into an output driving voltage VOUT.

The buck boost LED driver 203 includes a switch component, a first inductor 209, a second capacitor 213, and a first diode 211. The switch component, such as a power transistor 207, has a gate electrically connected to the signal generator 205 and has a source electrically connected to the common ground terminal 201, in which the power transistor 207 is controlled by the pulse width modulation signal to pass a charging voltage VCC. The first inductor 209 has a first terminal electrically connected to the common ground terminal 201. The first inductor 209 is charged by the charging voltage VCC to generate an inductor current $I_L$ when the power transistor 207 is turned on. Particularly, the common ground terminal 201 also acts as a ground terminal for the LED driver integrated circuit 221, and this connection constitute a Boostrap structure which increases the input impedance. By employing the Boostrap structure in the power supply of the driving circuit, the high voltage process, such as a 40V process, can be implemented in the high power input which can be a 110V AC input or a 220V AC input, and the cost for the driving circuit can be reduced.

The second capacitor 213 has one terminal electrically connected to the common ground terminal 201. The second capacitor 213 is charged by the inductor current $I_L$ and provides the output driving voltage at its both terminals (+ −). In fact, the longer the duty cycle of the pulse width modulation is, the greater the voltage potential stored in the second capacitor 213 is. The first diode 211 has a positive terminal (Anode) electrically connected to the first inductor 209 and has a negative terminal (Cathode) electrically connected to the second capacitor 213.

Figure 3:
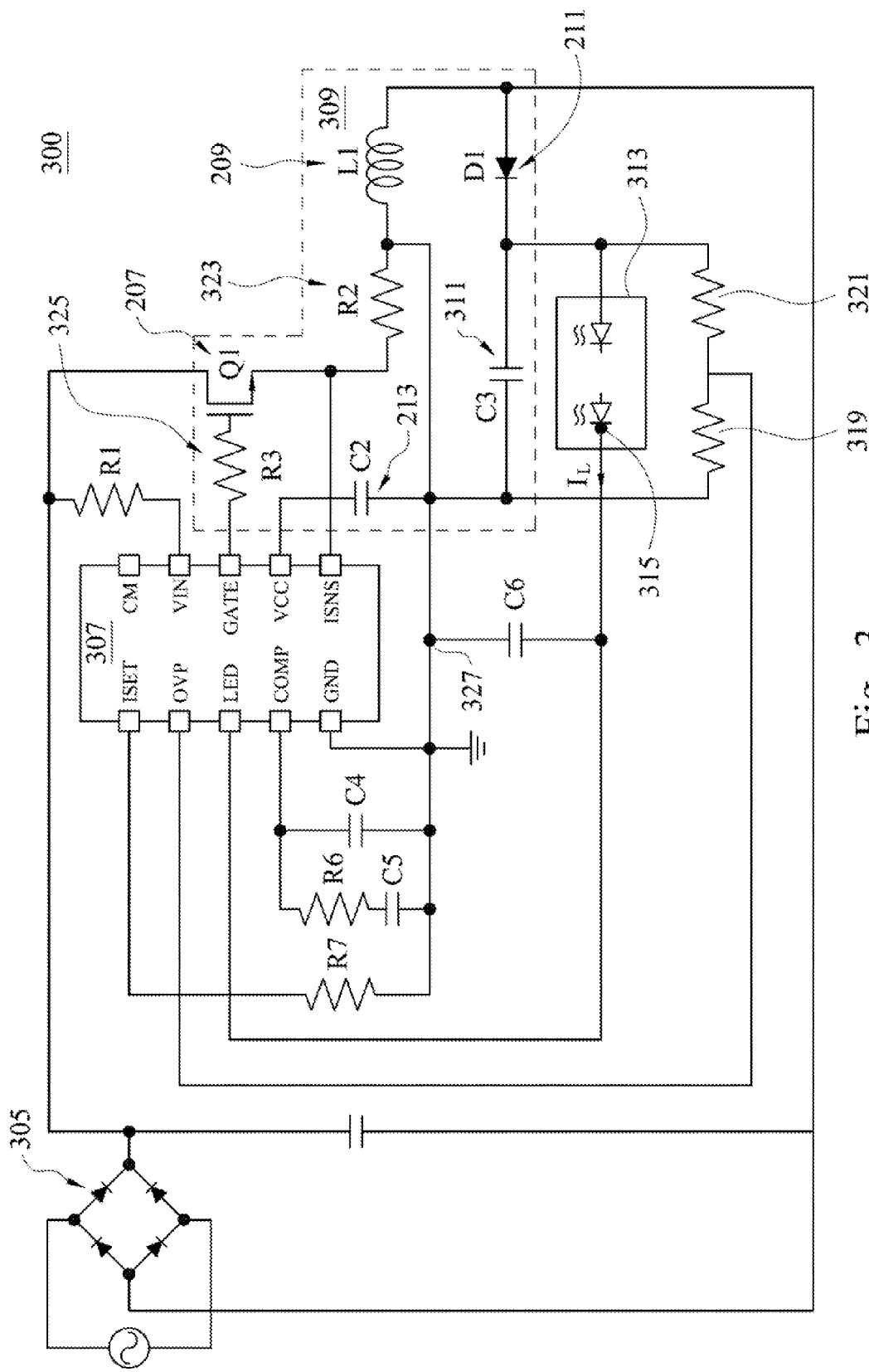
FIG. 3 is a circuit diagram of a driving circuit for driving the LED load according to one embodiment of the present invention.

FIG. 3 is a circuit diagram of a driving circuit for driving the LED load according to one embodiment of the present invention. The driving circuit 300 substantially includes a rectifier circuit 305, a LED driver integrated circuit 307 and a buck boost LED driver 309.

In addition to the power transistor 207, the first inductor 209, the second capacitor 213, and the first diode 211, the buck boost LED driver 309 of this embodiment further includes a third capacitor 311, a second resistor 323, and a third resistor 325. The third capacitor 311 has one terminal electrically connected to the common ground terminal 327 and has the other terminal electrically connected to the negative terminal of the first diode 211, in which the LED load 313 is also electrically connected to the other terminal of the third capacitor 311. The second resistor 323 is electrically connected between the power transistor 207 and the first inductor 209. The third resistor 325 is electrically connected between the signal generator in the LED driver integrated circuit 307 and the power transistor 207.

In this embodiment, the LED driver integrated circuit 307 at least includes a signal generator (pin out at "Gate"), a current control circuit (pin out at "LED"), and an error detecting circuit (pin out at "OVP").

The current control circuit controls a current volume of a load current $I_L$ flowing through the LED load 313 and provides a remaining voltage at the negative terminal 315 of the LED load 313 to the signal generator residing in the LED driver integrated circuit 307. Therefore, the signal generator can adjust the period of the duty cycle of the pulse width modulation signal according to the state of the LED load 313. For example, if the remaining voltage at the negative terminal 315 is too high, the signal generator will shorten the period of the duty cycle to reduce the unnecessary power consumption. Subsequently, the current control circuit locks the current volume of the load current $I_L$ when the LED load is able to turn on and the remaining voltage is minimized, that is, the current control circuit keeps the current volume of the load current $I_L$ as a constant.

The error detecting circuit monitors the LED load 313 as well as the current control circuit and stops the buck boost LED driver from operation according to a monitoring result. Specifically, the error detecting circuit stops the buck boost LED driver from operation when the LED load 313 or the current control circuit is open or short. This error detecting circuit includes the fourth resistor 321, the fifth resistor 319, and certain circuit residing in the LED driver integrated circuit 307, in which this certain circuit has an OVP pin as an input port for signals.

Figure 4:
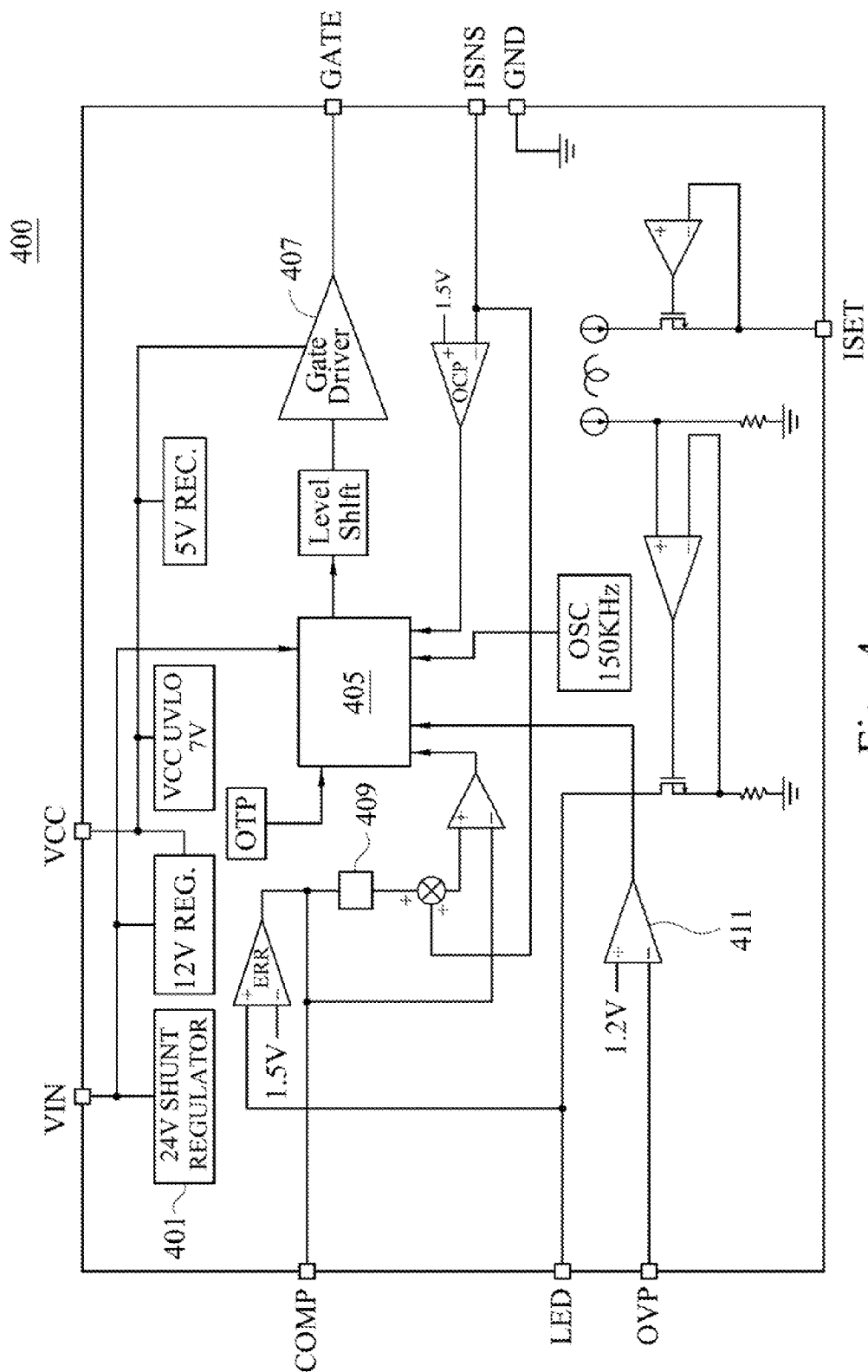
FIG. 4 is a circuit diagram of a LED driver integrated circuit according to one embodiment of the present invention.

FIG. 4 is a circuit diagram of a LED driver integrated circuit according to one embodiment of the present invention. The LED driver integrated circuit 400 typically includes a shunt regulator 401. The control logic 405 and the gate driver 407 as the signal generator, and the comparator 411 as well as the control logic 405 as the error detecting circuit. In addition, an integrator 409 can also be employed for generating an integral voltage. The integral voltage is added to the ISNS voltage, and the addition result is compared with the signal come from the "COMP" port, such that the gate driver 407 can respond to the voltage variation of the DC power supply outputted from the rectifier circuit, which improves the power factor.

FIG. 5 shows wave diagrams of LED voltages and LED current. As shown in FIG. 5, the traditional voltage signal VLED and the traditional current signal ILED have ripples and are not kept as a constant while the voltage signal VLED and the current signal ILED of the present invention have little ripples and can be kept as constants.

The driving circuit of the above embodiments utilizes a rectifier circuit and a single LED driver integrated circuit to convert an AC power source into a to DC power source first, and the DC power source is subsequently converted into a CC (Constant Current) power source to drive the LED load. As a result, the current and the voltage of the LED load can be stable without ripples, and the flicker problem can be prevented, which improves the lighting quality. In addition, a power factor corrector is also employed to improve the power factor (PF), which further reduces the unnecessary power consumption.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving circuit for driving a LED load, the driving circuit comprising:
   a rectifier circuit for rectifying an AC power supply into a DC power supply; and
   a LED driver integrated circuit comprising:
      a regulator circuit for regulating the de power supply into a regulated voltage;
      a voltage detector for detecting whether the regulated voltage meets a voltage requirement and for outputting the regulated voltage when the voltage requirement is met;
      a signal generator, electrically connected to the voltage detector, for generating a pulse width modulation signal; and
      a common ground terminal, wherein voltage potentials at the common ground terminal and at a load ground terminal of the LEE) load are the same; and
   a buck boost LED driver for converting the regulated voltage detected into an output driving voltage according to a remaining voltage at a negative terminal of the LED load to drive the LED load.

2. The driving circuit as claimed in claim 1, wherein the LED driver integrated circuit further comprises:
   a current control circuit for controlling a current volume of a load current flowing through the LED load and for providing a remaining voltage at the negative terminal of the LED load to the signal generator.

3. The driving circuit as claimed in claim 2, wherein the current control circuit locks the current volume of the load current when the LED load is able to turn on.

4. The driving circuit as claimed in claim 1, wherein the buck boost LED driver is a bootstrap type inverting buck boost LED driver.

5. The driving circuit as claimed in claim 1, wherein the buck boost LEE) driver comprises:
   a switch component having a first terminal electrically connected to the signal generator and having a second terminal electrically connected to the common ground terminal, wherein the switch component is controlled by the pulse width modulation signal to pass a charging voltage;
   a first inductor having a first terminal electrically connected to the common ground terminal, wherein the first inductor is charged by the charging voltage to generate an inductor current;
   a second capacitor having one terminal electrically connected to the common ground terminal; and
   a first diode having a positive terminal electrically connected to the first inductor and having a negative terminal electrically connected to the second capacitor.

6. The driving circuit as claimed in claim 5, wherein the second capacitor is charged by the inductor current and provides the output driving voltage at its both terminals.

7. The driving circuit as claimed in claim 5, wherein the buck boost LED driver further comprises:
   a third capacitor having one terminal electrically connected to the common ground terminal and having the other terminal electrically connected to the negative terminal of the first diode, wherein the LED load is also electrically connected to the other terminal of the third capacitor.

8. The driving circuit as claimed in claim 5, wherein the buck boost LED driver further comprises:
   a second resistor electrically connected between the switch component and the first inductor.

9. The driving circuit as claimed in claim 8, wherein the buck boost LED driver further comprises:
   a third resistor electrically connected between the signal generator and the switch component.

10. The driving circuit as claimed in claim 5, wherein the switch component is a power transistor.

11. The driving circuit as claimed in claim 5, wherein the LED driver integrated circuit further comprises:
   an error detecting circuit for monitoring the LED load and for stopping the buck boost LED driver from operation according to a monitoring result.

12. The driving circuit as claimed in claim 11, wherein the error detecting circuit stops the buck boost LED driver from operation when the LEI load is open or short.

13. The driving circuit as claimed in claim 11, wherein the error detecting circuit comprises:

a fourth resistor having one terminal electrically connected to the negative terminal of the first diode;
a fifth resistor having one terminal electrically connected to the other terminal of the fourth resistor and having the other terminal electrically connected to the common ground terminal; and
a conductive wire having one end electrically connected to the other terminal of the fourth resistor and having the other end electrically connected to a over voltage protection pin of the LED driver integrated circuit.

14. The driving circuit as claimed in claim 1, wherein the rectifier circuit is a bridge rectifier.

\* \* \* \* \*